United States Patent [19]

Sutton et al.

[11] Patent Number: 5,363,221
[45] Date of Patent: Nov. 8, 1994

[54] OPTICAL MULTIPLEXER

[75] Inventors: Philip Sutton; Andrew P. Shaw, both of Hants; William Dawber, East Sussex; Peter F. Hirst, Dyfed; Brian Condon, Bradford, all of England

[73] Assignee: The Secretary of State for Defence in her Britannic Majesty's Government of the United Kingdom of Great Britain and Northern Ireland

[21] Appl. No.: 937,860
[22] PCT Filed: Mar. 11, 1991
[86] PCT No.: PCT/GB91/00382
  § 371 Date: Oct. 16, 1992
  § 102(e) Date: Oct. 16, 1992
[87] PCT Pub. No.: WO91/14321
  PCT Pub. Date: Sep. 19, 1991

[30] Foreign Application Priority Data

Mar. 13, 1990 [GB] United Kingdom ............ 9005647.4

[51] Int. Cl.$^5$ ............ H04J 14/00; G02F 1/11; H04B 10/00
[52] U.S. Cl. ............ 359/11; 359/115; 359/124; 359/285; 359/298; 359/305; 372/21; 372/33; 385/10
[58] Field of Search ............ 359/10, 11, 109, 115–118, 359/124, 145, 127–132, 154, 161, 180, 181, 189, 191, 237, 238, 240, 285, 298, 305, 309, 310; 372/9, 13, 21, 23, 26, 33; 385/4, 7, 8, 10

[56] References Cited

U.S. PATENT DOCUMENTS

| 3,256,443 | 6/1966 | Moore | 359/145 |
| 4,225,938 | 9/1980 | Turpin | 359/285 |
| 4,328,576 | 5/1982 | Oakley | 359/130 |
| 4,389,093 | 6/1983 | Jackson | 359/298 |
| 4,468,766 | 8/1984 | Spezio | 359/130 |
| 4,775,972 | 10/1988 | Ih et al. | 359/124 |
| 4,809,359 | 2/1989 | Dockery | 359/285 |
| 4,952,010 | 8/1990 | Healey | 359/11 |
| 4,976,520 | 12/1990 | Brandstetter et al. | 359/124 |
| 5,010,346 | 4/1991 | Hamilton et al. | 359/124 |

FOREIGN PATENT DOCUMENTS 0016608 10/1980 European Pat. Off. .
0397372 11/1990 European Pat. Off. .

OTHER PUBLICATIONS

Shimazu et al., "Wavelength-Division-Multiplexing Optical Switch using Acoustooptic Deflector", pp. 1742–1747, Dec. 1987.
Harris et al., "Acoustic-Optic Photonic Switch", Nov. 1989, pp. 1177–1179.

Primary Examiner—Alpus H. Hsu

[57] ABSTRACT

Light from a laser (10) is divided by a beam splitter (12) to provide signal (15) and reference (14) channels. The signal channel light is expanded (11) to illuminate an acousto-optic (AO) device (13). This leads to a spatial distribution of Doppler shifted frequencies. This spatial distribution then illuminates a spatial light modulator (SLM) (19) such that a number of parallel and discrete optical channels (112) emerge. In a local area network (LAN) the optical signal channels are coupled into a single mode optical fibre (22) and then heterodont to the reference laser light from a further optical fibre (23) in an optical coupler (25). In a receiver the modulated light is detected (32) and the detected signal connected to the transducer of an AO device (35). The AO device (35) is illuminated by a receiver laser light (36) and the emerging modulated light is incident on a focal plane detector array (39) where each detector (310) then receives light corresponding to each of the transmitted channels (311). A secure free space communications system is possible by separate transmission of a delayed (43) unmodulated reference signal. The receiver is then arranged to include an identical delay (55) in the signal channels before coupling together the signal and reference channels (56) for modulating the AO cell (35). By this means the transmission delay lines (43) and the reference delay lines (55) must have delays which are equal within the coherence length of the source laser.

23 Claims, 4 Drawing Sheets

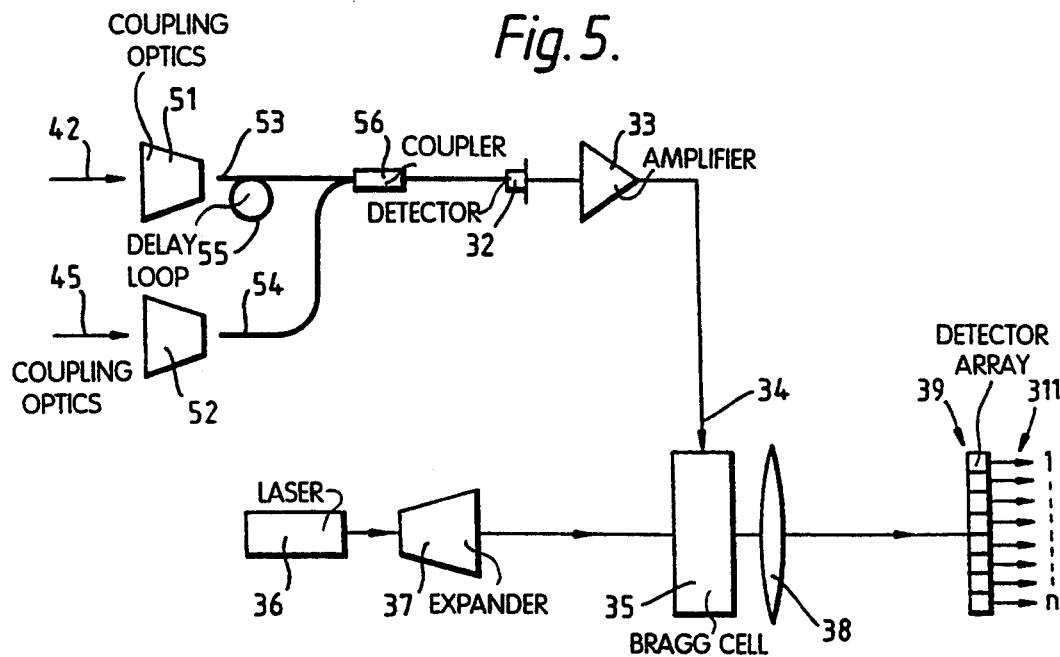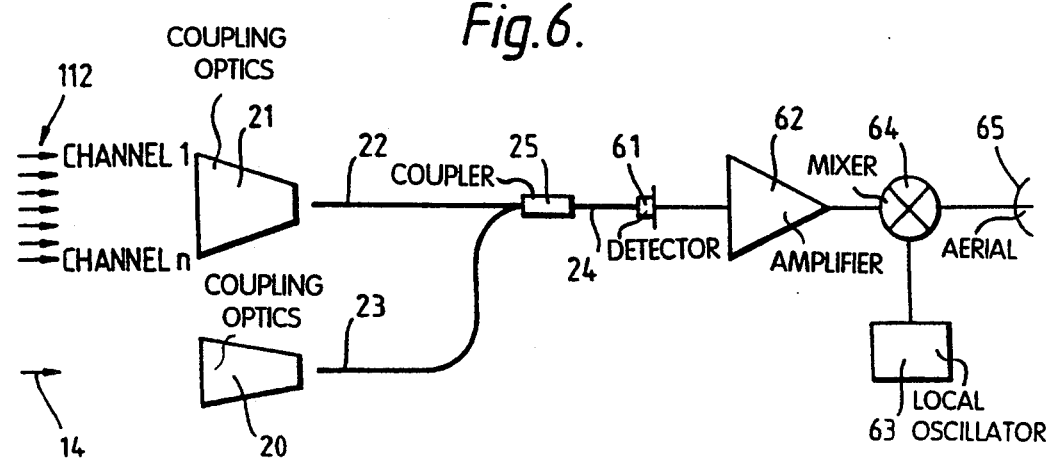

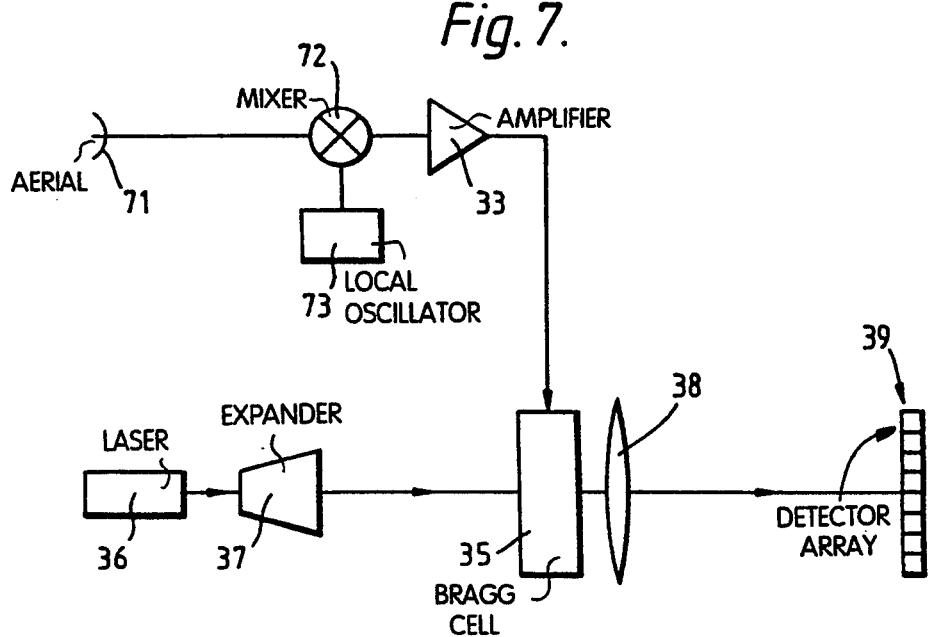
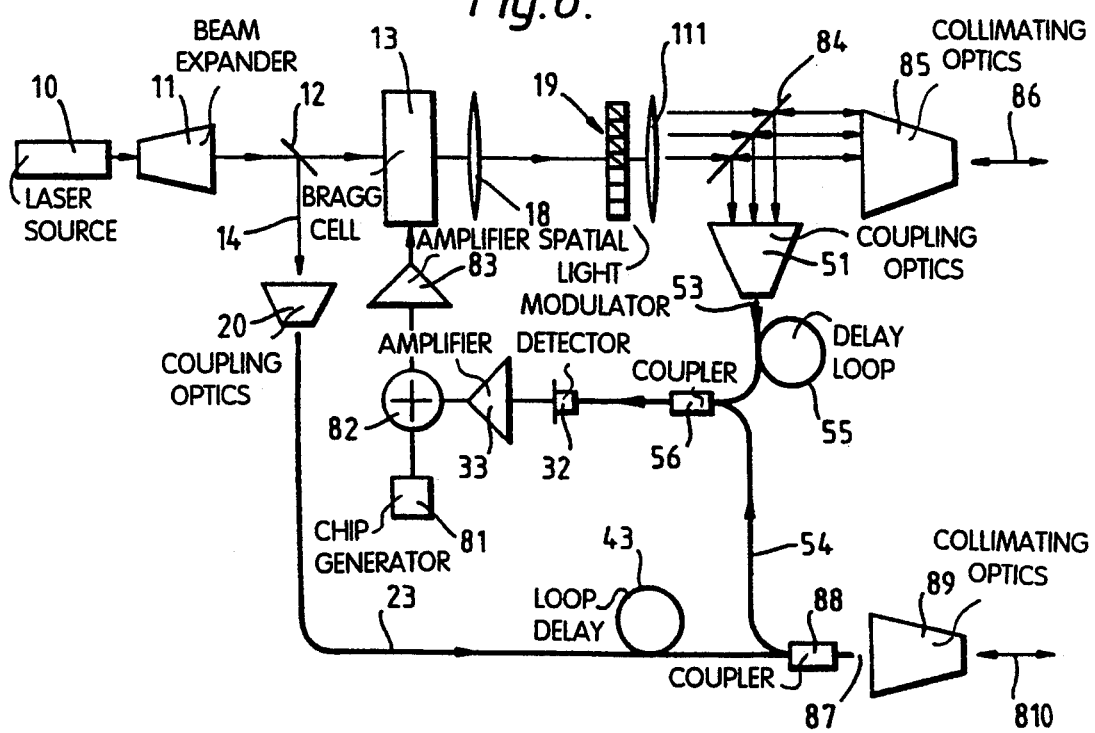

OPTICAL MULTIPLEXER

BACKGROUND OF THE INVENTION

1. Field of the Invention

The invention relates to communications systems and in particular to such systems employing optical transmission links.

2. Discussion of the Prior Art

Modern computing and communications systems require ever higher data transmission rates. The speed of transmission is limited by the usable bandwidth of the transmission medium. In the case of transmission along coaxial cables, for example, data rates are limited to around a few hundred megahertz over large distances.

Optical transmission systems offer theoretical bandwidths of peta-hertz. If the transmission is in a dispersive medium, then this data rate is considerably reduced. In commercially available single mode optical fibres, for instance, the theoretical limit is greater than a few hundred gigahertz. This limitation arises from the maximum speeds at which the driving electronics can operate.

SUMMARY OF THE INVENTION

The object of the present invention is to provide a communications system capable of operation at high data rates by exploitation of the available bandwidth in optical transmission links.

The invention provides an optical multiplexer for a communications system comprising:

a substantially monochromatic light source, preferably a laser;

moving grating means to disperse light from the source to provide a plurality of spatially separated output light beams, each beam having a different non-overlapping optical frequency bandwidth; and a spatial light modulation means having a plurality of electrical signal input connections corresponding to spatially separated modulation channels, each channel having incident thereon a respective one of the output light beams to form thereby a plurality of parallel signal beams providing orthogonal communications channels.

The principle of operation of the invention relies on the Doppler shift in frequency of optical radiation diffracted by an acousto-optic Bragg cell or other moving grating.

The optical multiplexer thus uses frequency division multiplexing, providing parallel optical channels which can be transmitted through free space or combined in a single optical fibre.

Preferably the light dispersing means comprises an acousto-optic (A-O) device having an input transducer and a source of polychromatic radio frequency signals (RF) connected to the input transducer and a Fourier Transforming (FT) lens providing an FT of the A-O output in a focal plane in which the light modulation means is located. Advantageously the RF source generates a chirp frequency function. Light transmitted through the A-O device is diffracted such that the angles of diffraction of the light are proportional to the frequency components of the RF signals. This produces a spanial distribution in the focal plane of the lens where the transverse displacement from the optic axis is proportional to the frequency of the RF signal. In the preferred arrangement a beam expander is provided such that the A-O device, preferably a Bragg cell. is uniformly illuminated by the laser light. The drive signal to the A-O device is selected to be wide band to make use of the full range of channels of the spatial light modulating means. In a particular arrangement the A-O drive signal may be chosen to make use of only a selected number of the available channels.

Preferably the light modulation means is a 1-dimensional spatial light modulator (SLM) and the output light beams from the A-O cell are focussed by the lens onto the SLM. The SLM is located such that each element thereof defines an independent frequency channel. In one form the laser light may be incident on a plurality of Bragg cells aligned such that the output beams therefrom ape directed to respective lines of a 2-dimensional SLM. Alternatively the SLM could be an optically scattering or transmitting surface whose 2-dimensional structural details are to be scanned and transmitted.

In the preferred arrangement an unmodulated reference beam is also provided by the laser source, advantageously by means of a beamsplitter located between the source and the A-O cell. In an optical fibre communications system each signal beam in the communications channels may be heterodyned to the reference beam by coupling the signal beams into a first optical fibre, the reference beam into a second optical fibre, and coupling together the first and second optical fibres into a single transmission optical fibre.

In this arrangement a receiver may include a detector whose output is connected to an acousto-optic device, preferably a Bragg cell, arranged to modulate light from a laser light source such that a plurality of beams corresponding to said spatially separated communications channels is produced and a detector array is located such that each beam is incident on a respective detector element of the detector array. In an alternative arrangement the received optical signal is incident on an arrangement of high spatial frequency diffraction gratings whereby the signal channels are separated by means of their varying bandwidth. In this arrangement mutual interference or cross-talk which arises as a result of non-linear mixing at a detector is avoided.

Mixing terms due to detection can also be avoided by:

placing a different optical delay at the output of each spatial light modulator output channel, the delays being chosen to be large ie comparable to the coherence length of the light;

providing a reference beam corresponding to each channel, each reference beam being derived from a common source beam and having an optical delay matching the channel delay.

When used in a free space communications system the signal beams are transmitted through collimating optics to produce a free space signal beam. Advantageously the transmitter is arranged such that a delay is introduced between the free space signal beam and the reference beam and the receiver is arranged such that a complementary delay is introduced to thereby bring the signal beams and reference beam into time synchronism. Preferably the delays are introduced by transmitting one of the reference or signal beams via a length of optical fibre in the transmitter and the other of the reference or signal beams via a similar length of optical fibre in the receiver. Conveniently the optical fibre delays are arranged as loops.

The reference beam may be transmitted via one of the spatial light modulator channels such that it is separated in the receiver in similar manner to the communication channels.

A communications system transceiver may comprise a transmitter including an optical multiplexer and a receiver as described above wherein a single Bragg cell is employed; a polychromatic signal generator being provided to drive the Bragg cell during transmission and the received frequency modulated signal being connected to drive the Bragg cell during reception.

The optical multiplexer of the present invention may also be used in a radio frequency (RF) communications system. In an RF system transmitter signal light beams and a reference beam from the optical multiplexer are coupled to an optical fibre connected to an optical detector, the output of which is arranged to modulate an FM carrier signal for connection to an FM aerial. In the FM system the signal is detected by means of an aerial to receive the FM carrier and a local oscillator to demodulate the signal.

In all the above arrangements the optical fibres are preferably single mode.

In the above arrangements the light source may be relatively wide band, eg 3 nm, and a diffraction grating may be placed between the source and the spatial light modulating means and arranged to diffract light in a direction orthogonal to the A-O device diffraction. Demodulation at a receiver is then carried out by a similar 2-dimensional diffractive process.

BRIEF DESCRIPTION OF THE DRAWINGS

The invention will now be described with respect to the accompanying drawings of which:

FIG. 5 is a modification of the FIG. 3 arrangement for receiving transmissions from the FIG. 4 transmitter;

FIG. 6 illustrates use of the FIGS. 1 and 2 arrangements in an RF transmission system;

FIG. 7 is a modification of FIG. 3 for reception of the FIG. 6 RF signals; and

FIG. 8 is a schematic diagram of a free space optical transceiver system.

DETAILED DESCRIPTION OF PREFERRED EMBODIMENTS

Figure 1:
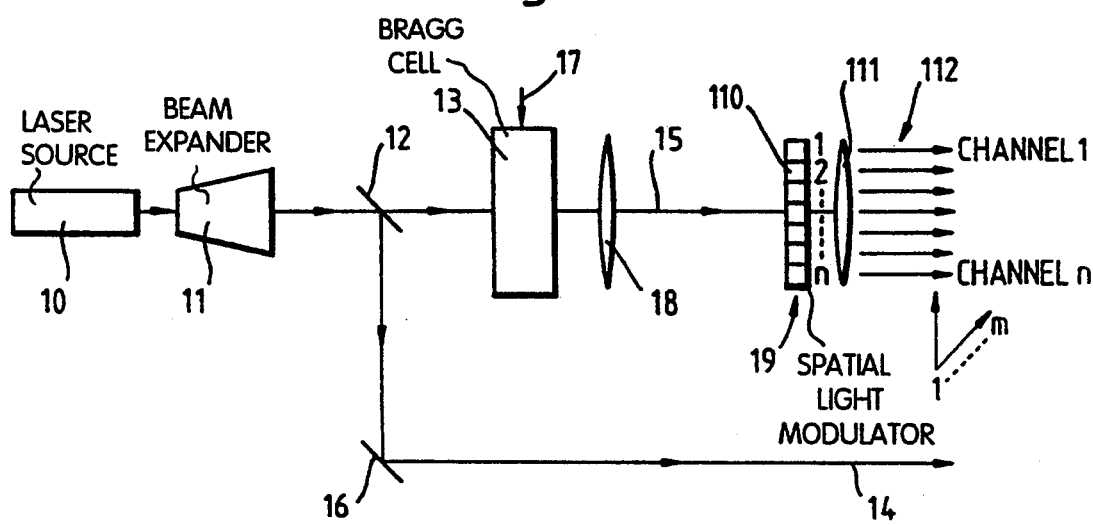
FIG. 1 is a schematic representation of an optical multiplexer according to the invention.

An optical multiplexer is shown in FIG. 1. Light from a laser source 10 is transmitted through a beam expander 11 and a beam splitter 12 so as to uniformly illuminate a Bragg cell 13. The beam splitter 12 partially reflects the incident laser light to produce a reference beam 14, shown parallel to the optical axis 15 of the multiplexer after reflection from mirror 16. A frequency chirp or polychromatic RF signal 17, which may be continuous or comprised of a series of pulses, is applied to the input transducer (not shown) of the Bragg cell 13. An acoustic wave having a corresponding frequency spectrum is then produced in the Bragg cell 13. The laser light incident on the Bragg cell 13 is diffracted by the acoustic wave such that the light emerging from the Bragg cell diverges since the angles of diffraction of the light are proportional to the frequency components of the acoustic wave. The diffracted light from the Bragg cell 13 is focused by a lens 18 on to a linear spatial light modulator (SLM) 19 having n elements. The SLM 19 is arranged so that the different diffraction components are spread along its length. The acoustic wave interaction with the laser light in the Bragg cell simultaneously produces a Doppler frequency shift of the output light which is proportional to the frequency of the RF signal applied to the Bragg cell. Thus the Doppler shift varies across the spatial distribution of light output from the Bragg cell by an amount proportional to the transverse displacement from the optic axis 15. This means that for any given transverse position 110 (say) there will be an associated Doppler frequency. Thus each element of the SLM 19 defines a different frequency channel and light transmitted through the SLM 19 and rendered parallel to the optical axis by lens 111 provides n optical output beams or channels 112, each of which can be modulated by application of appropriate signals S1 ... Sn applied to the n elements of the SLM 19. The maximum modulation rate (bandwidth) of each channel is then proportional to the separation of the channels. The total capacity of the system is the sum of the channel bandwidths and this is determined by the bandwidth of the Bragg cell; currently Bragg cells with bandwidths of 10 gigahertz are available.

Figure 2:
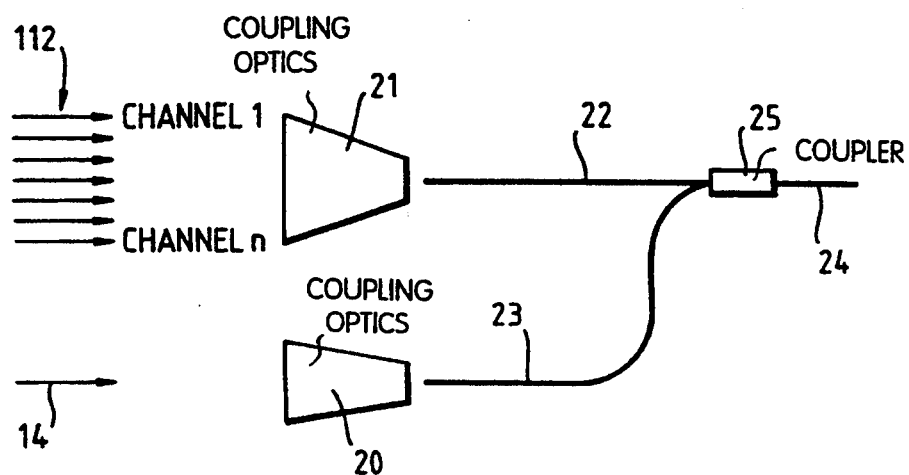
FIG. 2 illustrates a coupling arrangement connecting outputs from the FIG. 1 multiplexer for transmitting signals to an optical fibre.

The n signal channels 112 and the reference beam 14 may be coupled to a fibre optic communications system as shown in FIG. 2. Channels 112 are coupled by coupling optics 21 to a single mode optical fibre 22. The reference beam 14 is coupled to a second single mode optical fibre 23 by further coupling optics 20. The two fibres 22 and 2B are coupled to an output single mode optical fibre 24 via a coupler 25. The signal and reference beams are thus mixed by the coupler 25 and the signal transmitted via the output fibre 24 consists of a radio frequency modulated monochromatic beam.

Figure 3:
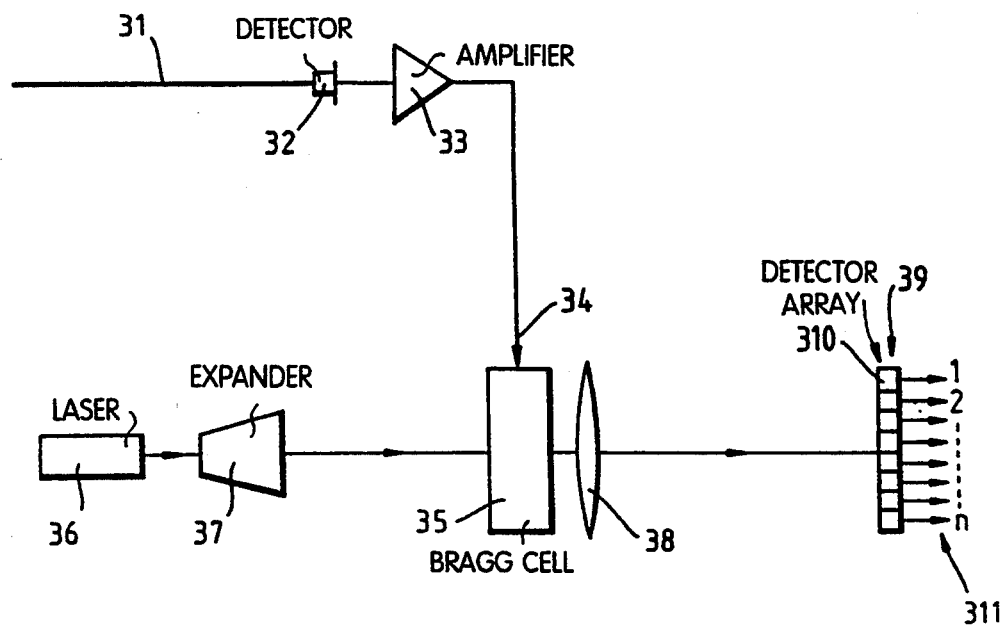
FIG. 3 is a schematic drawing of a receiver demultiplexer arrangement for connection to the optical fibre of FIG. 2.

After transmission the modulated beam is connected via an input single mode optical fibre 31 (which may be identical to the fibre 24) to a detector 32 as shown in FIG. 3. The detected signal is connected via an amplifier 33 to the input 34 of a Bragg cell 35. Light from a laser 36 is expanded (37) and collimated to illuminate the Bragg cell 35. Diffracted light from the Bragg cell 35 is focused by a lens 38 on to a linear detector array 39. The spatially distributed frequency channels 112 are thus recreated on the detector array 39. The detector array 39 has n elements with each element 310 corresponding to one of the frequency channels 112. The n output signals 311 from the detector array 39 are the demultiplexed signals.

Figure 4:
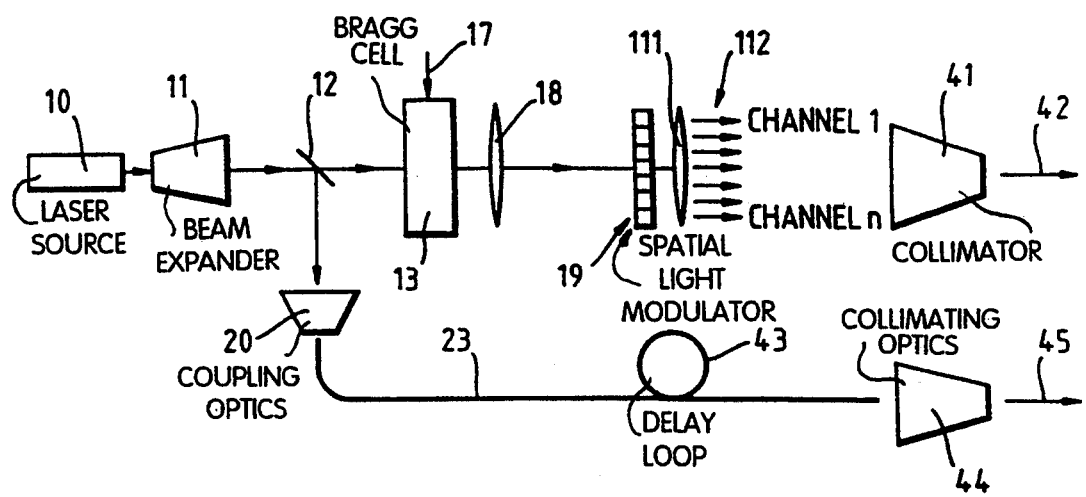
FIG. 4 illustrates a modification of the FIG. 1 arrangement for secure free space transmission.

The optical transmitter/receiver system can be modified as shown in FIGS. 4 and 5 to provide a secure free space transmission system where like integers are indicated by like reference numerals. The n frequency channels 112 are collimated (41) to produce a free space signal FM signal beam 42. The reference beam in the fibre 23 is delayed relative to the signal by providing a delay loop 43 in the fibre before connection to collimating optics 44 to provide a free space reference beam 45. In the receiver (FIG. 5) the signal and reference beams 42 and 45 are connected via respective coupling optics 51 and 52 to single mode optical fibres 53 and 54. A delay loop 55 is provided in the signal fibre 53 to bring the signal and reference beams into time coincidence before mixing in a coupler 56. The output from the coupler 56 is then detected and used to modulate the Bragg cell 35 as in the FIG. 3 receiver. In this arrangement the transmitter delay of the reference beam in delay loop 43 and the reception delay of the signal beam in loop 55 must be equal within the limit of the coherence length of the source laser otherwise demultiplexing will not occur. Providing this criterion holds, the detected FM signal applied to the Bragg cell 35 reconstructs the transmitted output channels 112 on the detector array 39 and hence the demultiplexed signals S1 ... Sn appear at the outputs 311 of the elements 1—n of the detector array 39.

FIGS. 6 and 7 show a further application of the optical multiplexer of FIG. 1 to a radio frequency communications system. Elements of this system in common with the fibre optic system described in relation to FIGS. 1-3 are represented by like reference numerals. The signal and reference beam outputs 112, 114 from a multiplexer as in FIG. 1 are coupled in to single mode optical fibres 22, 23 and then coupled together in a further single mode fibre 24. The resulting signal is connected to a detector 61 and after amplification (62) is used to modulate an RF carrier from a local oscillator 63 in mixer 64. The RF signal is then radiated by an aerial 65. In the receiver (FIG. 7) signals from an FM aerial 71 are heterodyned in a mixer 72 with the carrier frequency produced by a local FM oscillator 73. The output from the mixer 72 after amplification (33) is used to drive the Bragg cell 35 and demultiplexing occurs as described in relation to FIG. 3.

A secure transceiver system for free space optical communications is shown in FIG. 8 where elements common to FIGS. 1-5 are shown with like reference numerals. In this arrangement the free space transmitter of FIG. 4 and the receiver of FIG. 5 are combined into a single unit using only one Bragg cell 13.

In transmission mode the Bragg cell 13 is driven by a signal connected from chirp generator 81 via adder 82 and amplifier 83 to the input of the Bragg cell 35. The signal beams after transmission through lens 111 are transmitted through a beamsplitter 84 to collimating optics 85 for producing the free space signal beam 86. Alternatively coupling optics could be used as in FIG. 2 for connection to an optical fibre. The reference beam 14 after transmission via the optical fibre loop delay 43 is transmitted to a fibre terminous 87 via coupler 88. Light from the terminous 87 passes through collimating optics 89 to provide a free space reference beam 810. In reception mode received signal and reference beams 86 and 810 are transmitted through the respective optical components 85 and 89. The signal beam is reflected by the beamsplitter 84 through coupling optics 51 to the delay loop 55 in optical fibre 53. The reference beam is coupled to the optical fibre 54 via coupler 88. The delayed signal beam in fibre 53 is heterodyned to the reference signal from the fibre 54 in the coupler 56. The frequency modulated output from coupler 56 is then detected (32) and connected via amplifier 33, adder 82 and amplifier 83 to drive the Bragg cell 13.

Simultaneous transmission. reception, modulation and demodulation occur in this system. This allows multi-synchronous secure communications. Data may be transmitted in free space or in single mode fibres. A simpler system would allow data to be transmitted at radio frequencies.

A number of applications and advantages result from the implementation of the optical multiplexer which include:

1. High data rates. The data rate is limited by the Bragg cell bandwidth. At present up to 10 gigahertz is possible.
2. A high degree of parallelism is possible. This is limited by the timebandwidth product of the Bragg cell.
3. High data rates/parallelism lead to very low error rates through optical bit-checking.
4. Comparability with existing optical fibre data transmission systems.
5. The elimination of electronic multiplexers in telephony.
6. The transceiver may be reconfigured as an in-line booster for fibre optic communications.
7. The optical multiplexer may be used for the instantaneous (one-shot) transmission of two dimensional images. This is achieved using an array of acoustooptic elements to generate a two-dimensional spatial distribution of Doppler frequencies. A two dimensional SLM is used to transmit the image. Picture resolution may be automatically controlled by the frame rate.
8. The optical multiplexer may be used to enable the various elements of communications and control systems and computers to be separated by some distances. The high degree of parallelism implicit in optical multiplexerbased systems allows each element to communicate independently with every other element down a single fibre. Extremely robust distributed systems are possible without degrading overall system performance.
9. An extremely high degree of security from illicit surveillance is inherent in optical multiplexer-based systems incorporating a delayed reference beam. An eavesdropper would need to receive simultaneously the signal and reference beams and also incorporate the appropriate delay. Since the delay can be changed or modulated randomly, foreknowledge of the delay or modulation would be required. The observed signal cannot be stored whilst the correct delay is being sought because once detection has occurred, the phase information is lost. This process is called "coherence encryption".
10. The signal beam may be less intense than the reference beam. Misdirection is possible by modulation of the reference or signal with dummy information. The performance of the system is unaffected by this misdirection.
11. Multi-synchronous distributed systems may be used, for example. in ships and aircraft to achieve passive covert reception.
12. An integrated optics implementation allows the fabrication of small, robust systems.

In alternative arrangements to those described above the received optical signal may be incident on an arrangement of high spatial frequency diffraction gratings whereby the signal channels are separated by means of their varying bandwidth. In these arrangements mutual interference or cross-talk which arises as a result of non-linear mixing at a detector is avoided.

Mixing terms due to detection can also be avoided by:
  placing a different optical delay at the output of each spatial light modulator output channel, the delays being chosen to be large is comparable to the coherence length of the light;
  providing a reference beam corresponding to each channel, each reference beam being derived from a common source beam and having an optical delay matching the channel delay.

It is also possible for the reference beam to be transmitted via one of the spatial light modulator channels such that it is separated in the receiver in similar manner to the communication channels. In place of the SLMs described above use could be made of an optically scattering or transmitting surface whose 2-dimensional structural details are to be scanned and transmitted.

The light source used in the above arrangements may be relatively broad band, eg 3 nm, and a diffraction grating 100 as indicated in FIG. 1 may be placed between the source and the spatial light modulating means and arranged to diffract light in a direction orthogonal to the A-O device diffraction. This would result in a 2-dimensional array with, for example. m channels in the plane perpendicular to the paper. Demodulation at a receiver would then be carried out by a similar 2-dimensional diffractive process.

We claim:

1. An optical multiplexer for a communications system comprising:
   a substantially monochromatic light source;
   moving grating means for modulating and dispersing light from the source and for providing a plurality of spatially separated output light beams, each beam having a different non-overlapping optical frequency bandwidth;
   a spatial light modulation means (SLM) having array of spatial light modulating elements, each element of the array having an electrical signal input connection means for directing the spatially separated output beams from the moving grating means to respective modulating elements of the SLM, said SLM providing a plurality of SLM output beams, wherein a plurality of separate communication signals connected to the input connections to respective elements of the SLM produce output beams from the SLM comprising a plurality of orthogonal communications channels.

2. An optical multiplexer as claimed in claim 1 wherein the light source is a laser.

3. An optical multiplexer as claimed in claim 1 wherein the moving grating means comprises an acousto-optic (A-O) device having an input transducer and a drive source of polychromatic radio frequency (RF) signals connected to the input transducer, and a Fourier Transforming lens providing a Fourier Transform of the A-O output in a focal plane in which the light modulation means is located.

4. An optical multiplexer as claimed in claim 3 wherein the A-O drive signal is chosen to make use of only a selected number of the available channels.

5. An optical multiplexer as claimed in claim 3 said drive source comprises a means for generating a chirp frequency.

6. An optical multiplexer as claimed in claim 3 wherein a beam expander is provided such that the A-O device is uniformly illuminated by the laser light.

7. An optical multiplexer as claimed in claim 3 wherein the bandwidth of the light source is selected to be substantially 2 nm and a diffraction grating is placed between the source and the SLM and arranged to diffract light in a direction orthogonal to the the direction of diffraction of the A-O device to thereby produce a 2-dimensional light beam.

8. An optical multiplexer as claimed in claim 1 characterized in that the SLM is an optically scattering or transmitting surface whose 2-dimensional structural details are to be scanned and transmitted.

9. An optical multiplexer as claimed in claim 1 wherein the SLM comprises a 1-dimensional array of spatial light modulating elements, each element of the array corresponding to a different one of the spatially separated modulation channels, and the output light beams from the moving grating means are focussed by the lens onto the SLM, the SLM being located such that each element thereof defines an independent frequency channel.

10. An optical multiplexer as claimed in wherein an unmodulated reference beam is provided by the light source, 11. An optical multiplexer as claimed in claim 10 wherein the reference beam is provided by means of a beamsplitter located between the source and the moving grating means.

12. An optical multiplexer as claimed in claim 10 wherein the reference beam is transmitted via one of the spatial light modulation channels.

13. An optical fibre communications system comprising an optical multiplexer as claimed in claim 10 wherein each SLM output beam in the communications channels is heterodyned to the reference beam by coupling the signal beam into a first optical fibre, the reference beam into a second optical fibre, and coupling together the first and second optical fibres into a single transmission optical 14. (Amended) An optical fibre communications system as claimed in claim 13 wherein the light source is a laser said optical fibre communications system further comprises provided a receiver including a detector whose output is connected to an acoustooptic Bragg cell arranged to modulate light from a laser light source such that a plurality of beams corresponding to said spatially separated communications channels is produced and a detector array is located such that each beam is incident on a respective detector element of the detector array.

15. An optical fibre communications system comprising a transceiver having a transmitter including an optical multiplexer and a receiver as claimed in claim 14 wherein a single Bragg cell is employed, further providing a polychromatic signal generator to drive the Bragg cell during transmission and the received frequency modulated signal being connected to drive the Bragg cell during reception.

16. An optical fibre communications system as claimed in claim 13 wherein each optical fibre is a single mode optical fibre.

17. An optical fibre communications system for free space transmission between a transmitter and a receiver comprising an optical multiplexer as claimed in claim 10 wherein the signal beams in the transmitter are transmitted through collimating optics to produce a free space signal beam.

18. An optical fibre communications system as claimed in claim 17 wherein the transmitter is arranged such that a delay is introduced between the free space signal beam and the reference beam and a receiver is provided and is arranged such that a complementary delay is introduced to thereby bring the signal beams and reference beam into time synchronism.

19. An optical fibre communications system as claimed in claim 18 wherein the delays are introduced by transmitting one of the reference or signal beams via a length of optical fibre in the transmitter and the other of the reference or signal beams via a similar length of optical fibre in the receiver.

20. An optical fibre communications system as claimed in claim 19 wherein the optical fibre delays are arranged as loops.

21. An optical multiplexer as claimed in claim 1 wherein a different optical delay is provided at the output of each spatial light modulator output channel, the delays being chosen to be comparable to the coherence length of the light;

said optical multiplexer further comprises means for producing a reference beam corresponding to each channel, each reference beam being derived front a common source beam and having an optical delay matching the channel delay.

22. A radio frequency (RF) communications system for communication between an RF transmitter and an RF receiver, wherein the RF transmitter employs an optical multiplexer as claimed in claim 1 wherein the plurality of signal light beams and a reference beam from the light source are coupled to an optical fibre connected to an optical detector, the output of which is arranged to modulate an FM carrier signal for connection to an FM transmitter aerial for transmission of the signal.

23. A radio frequency (RF) communications system as claimed in claim 22 wherein a signal received by said FM receiver is detected by means of a receiver aerial receiving the FM carrier and said receiver includes a local oscillator.

* * * * *